(12) United States Patent
Weimer et al.

(10) Patent No.: US 12,409,803 B2
(45) Date of Patent: Sep. 9, 2025

(54) VEHICLE OCCUPANT RESTRAINING SYSTEM

(71) Applicant: ZF AUTOMOTIVE GERMANY GMBH, Alfdorf (DE)

(72) Inventors: Benjamin Weimer, Spraitbach (DE); Werner Freisler, Schwäbisch Gmünd (DE); Annabelle Munding, Ruppertshofen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/015,115

(22) PCT Filed: Jul. 5, 2021

(86) PCT No.: PCT/EP2021/068443
§ 371 (c)(1),
(2) Date: Jan. 9, 2023

(87) PCT Pub. No.: WO2022/008403
PCT Pub. Date: Jan. 13, 2022

(65) Prior Publication Data
US 2023/0256930 A1    Aug. 17, 2023

(30) Foreign Application Priority Data
Jul. 10, 2020   (DE) .................... 10 2020 118 337.2

(51) Int. Cl.
*B60R 21/231*   (2011.01)
*B60R 21/233*   (2006.01)
*B60R 21/2338*   (2011.01)

(52) U.S. Cl.
CPC ...... *B60R 21/23138* (2013.01); *B60R 21/233* (2013.01); *B60R 21/2338* (2013.01);
(Continued)

(58) Field of Classification Search
CPC ............ B60R 21/231; B60R 21/23138; B60R 2021/23146; B60R 21/233;
(Continued)

(56) References Cited

U.S. PATENT DOCUMENTS 9,994,181 B1 * 6/2018 Dubaisi ................. B60R 21/207
2014/0159354 A1 * 6/2014 Fujiwara ........... B60R 21/23138
280/730.2
2018/0326938 A1  11/2018 Rickenbach et al.
2019/0299903 A1  10/2019 Nagasawa

FOREIGN PATENT DOCUMENTS

CN  110395213 A * 11/2019 ........... B60R 21/207
DE  102018107336 A1  10/2018
(Continued)

OTHER PUBLICATIONS

Description Translation for DE 102018/104392 from Espacenet (Year: 2018).*
(Continued)

*Primary Examiner* — Jason D Shanske
*Assistant Examiner* — Daniel M. Keck
(74) *Attorney, Agent, or Firm* — Tarolli, Sundheim, Covell &Tummino LLP

(57) ABSTRACT

A vehicle occupant restraint system (10) comprises a vehicle seat (12) including a backrest (14) with a seat back surface (24), wherein the seat back surface (24) is provided for a vehicle occupant seated in the vehicle seat (12) to lean there against, and comprises an airbag module (16) integrated in the vehicle seat (12) which includes an airbag (18) being L-shaped in a horizontal section plane. The airbag (18) has a fillable cushioning portion (20) forming a first leg of the L which is positioned along a seat longitudinal direction (L) spaced from the seat back surface (24), and a fillable connecting portion (22) forming a second leg of the L which connects the cushioning portion (20) to the vehicle seat (12).

(Continued)

The airbag (18) includes at least one stabilizing element (46) which counteracts a force (F) acting on the cushioning portion (20) and being directed away from the seat back surface (24), if the vehicle occupant impacts a baffle (30), so as to stabilize the cushioning portion (20) relative to the connecting portion (22).

16 Claims, 3 Drawing Sheets

(52) U.S. Cl.
CPC ............... *B60R 2021/23146* (2013.01); *B60R 2021/23384* (2013.01); *B60R 2021/23386* (2013.01)

(58) Field of Classification Search
CPC ........... B60R 2021/23308; B60R 2021/23316; B60R 2021/23324; B60R 2021/23332; B60R 21/2338; B60R 2021/23384; B60R 2021/23386
See application file for complete search history.

(56) References Cited

FOREIGN PATENT DOCUMENTS

| | | |
|---|---|---|
| DE | 102019103484 A1 | 8/2019 |
| DE | 102018114771 A1 | 9/2019 |
| WO | 2019/166268 A1 | 9/2019 |
| WO | WO-2019197164 A1 * 10/2019 | ............. B60R 21/16 |

OTHER PUBLICATIONS

Description Translation for DE 102019103484 from Espacenet (Year: 2019).*

Description Translation for CN 110395213 from Espacenet (Year: 2019).*

Description Translation for WO 2019/197164 from Espacenet (Year: 2019).*

PCT International Search Report for corresponding International Application Serial No. PCT/EP2021/068443, mailed Aug. 26, 2021, pp. 1-5.

* cited by examiner

VEHICLE OCCUPANT RESTRAINING SYSTEM

RELATED APPLICATIONS

This application is a U.S. National Stage Application filed under 35 USC 371 claiming priority to Serial No. PCT/EP2021/068443, filed on 5 Jul. 2021; which claims priority from German Patent Application DE 10 2020 118 337.2, filed 10 Jul. 2020, the entireties of which are hereby incorporated herein by reference.

TECHNICAL FIELD

The invention relates to a vehicle occupant restraint system.

BACKGROUND

Among other things, regarding the topic of autonomous driving, considerations are made to offer the vehicle occupants greater freedom in terms of their seating position. This entails that the position of the vehicle seats relative to other vehicle components becomes more indefinite. Consequently, there will be the necessity to equip the vehicle seats with airbags that have sufficient inherent rigidity to safely cushion the occupant seated in the associated seat even without any possibility of supporting the airbags on other vehicle components.

SUMMARY

Therefore, it is the object of the invention to improve the inherent rigidity of an airbag in a vehicle occupant restraint system.

This object is achieved by a vehicle occupant restraint system which comprises a vehicle seat having a backrest including a seat back surface, the seat back surface being provided for a vehicle occupant seated in the vehicle seat to lean against the same. Moreover, an airbag module integrated in the vehicle seat is provided which comprises an airbag that is L-shaped in a horizontal section plane and has a fillable cushioning portion forming a first leg of the L, the cushioning portion being positioned along a seat longitudinal direction spaced apart from the seat back surface, wherein the cushioning portion includes a baffle directed toward the seat back surface and provided to cushion the occupant when he/she moves forward along the seat longitudinal direction. In addition, the airbag comprises a fillable connecting portion forming a second leg of the L which connects the cushioning portion to the vehicle seat. The airbag has at least one stabilizing element counteracting a force directed away from the seat back surface and acting on the cushioning portion, when the vehicle occupant impacts the baffle, so as to stabilize the cushioning portion relative to the connecting portion.

The stabilizing element reduces a movement of the cushioning portion in the seat longitudinal direction and helps increase the dimensional stability of the airbag and stabilize the position of the cushioning portion relative to the connecting portion. The cushioning portion should preferably maintain, even during cushioning the vehicle occupant, as far as possible the position it takes in the unloaded state. The inherent rigidity of the airbag can be significantly increased by the stabilizing element so that the airbag can attain a sufficient restraining effect. Vehicle-side support surfaces for the cushioning portion of the airbag can be dispensed with.

Since the whole airbag is integrated in the vehicle seat, the airbag is always in the correct position to cushion the vehicle occupant in a situation of restraint, even if the vehicle seat is rotated relative to the vehicle longitudinal direction or the seat back is reclined into a comfort position, for example.

In this case, the seat longitudinal direction is defined by the direction of the arrangement of the seat back surface of the backrest and of a seat portion in which the vehicle occupant is seated and corresponds to the viewing direction of the vehicle occupant seated in the seat. In a conventional seat orientation, the seat longitudinal direction coincides with a vehicle longitudinal direction. A seat vertical direction in this case corresponds to the vertical.

In general, a jacket of the airbag which encloses an area of the airbag adapted to be filled with filling gas and forms an outer wall of the airbag can be composed of plural cut parts. The cut parts preferably comprise two L-shaped lateral parts as well as an inner and an outer surface part each being connected, at their peripheral edges, to the lateral parts. In addition, a front edge part may be provided which is connected to the two surface parts at a free end of the cushioning portion. The baffle may be part of the inner surface part.

In this way, all cut parts can be designed such that each per se can be flatly spread, that is, can be simply cut out of a fabric panel, while the finished airbag has a complex three-dimensional shape. As a matter of course, the shape of the individual cut parts can be freely selected at the skilled person's discretion, wherein, e.g., portions of the aforementioned cut parts can merge also integrally into each other or can be realized on a different cut part.

Preferably, the expansion of the connecting portion increases along the seat vertical direction, i.e., a height of the connecting portion, starting from the seat back to the transition to the cushioning portion (this point forms a corner where the transverse leg and the longitudinal leg of the L are adjacent).

The cushioning portion, on the other hand, preferably has a constant height and is particularly plate-shaped so that the baffle formed at the cushioning portion has an equal height at each position along a seat transverse direction. The baffle thus may be approximately rectangular. Preferably, the baffle is approximately perpendicular to the seat longitudinal direction and/or substantially in parallel to the backrest.

Basically, it is possible to dispose the stabilizing element in an interior of the fillable area of the airbag or outside the fillable area. The fillable area can be constituted by one or more fillable chamber(s) of the airbag.

For example, a tether extending through the fillable area of the airbag is provided. Also, a plurality of tethers can be provided. A force acting upon the cushioning portion when the vehicle occupant impacts the baffle is partially transmitted to the tether and can thus be deflected into the vehicle seat. As a result, the inherent rigidity of the airbag is increased and the three-dimensional L-shape of the airbag is stabilized and, specifically, the angle between the connecting portion and the cushioning portion is substantially maintained when the vehicle occupant impacts the baffle.

In a first possible variant, the stabilizing element is formed by at least one tether that is coupled, on the seat side, to a retracting mechanism which shortens the length of the tether in the fillable area of the airbag during the situation of restraint. It is possible, for example, to fabricate the tether of webbing material or any other suitable material and to provide a belt retractor or a belt tensioner as retracting mechanism to which the tether is connected at the vehicle seat. If the situation of restraint occurs, the retracting mechanism is activated and pulls the tether so that the effective length of the tether between the retracting mechanism and a fastening point of the tether within the airbag will be reduced. As a result, the cushioning portion can be pulled more closely to the seat back surface. This can ensure the cushioning portion to be stabilized in its position when the vehicle occupant immerses into the cushioning portion. Moreover, the load applied to the cushioning portion by the occupant can be absorbed by the tether and introduced to the vehicle seat.

The retracting mechanism is activated, for example, shortly before or only upon immersion of the occupant into the airbag.

It is possible to attach the tether on the airbag side to the outer wall of the cushioning portion facing the baffle, specifically to the outer surface part.

The fastening point of the tether is located, with respect to the vehicle transverse direction, e.g., approximately at one third of the distance from the transition of the connecting portion to the cushioning portion toward the free end of the cushioning portion. This allows to guide the tether straightly through the fillable area of the airbag and, thus, to obtain proper load effect on the cushioning portion.

In a second possible variant, at least one tether which, when flatly spread, has an L-shape corresponding to the L-shaped cross-section of the airbag, is provided in the fillable area of the airbag. In this case, the at least one tether has a flat shape, and its shape follows the outer contour of the airbag.

At least two tethers can be provided which are superimposed perpendicularly to the seat longitudinal direction and which subdivide the airbag into plural superimposed fillable chambers.

For example, exactly two tethers superimposed along the seat vertical direction which are interposed between the two lateral parts of the airbag are provided. In a substantially upright position of the backrest, the tethers in the deployed and filled airbag are oriented substantially horizontally in particular in the area of the cushioning portion.

Preferably, said tethers are connected to the jacket of the airbag at a plurality of points, specifically at the inner and outer surface parts and at the edge part.

It is also possible to dispose the stabilizing element at the exterior of the airbag, viz. outside the fillable area of the airbag.

In a third possible variant, the stabilizing element is at least one fabric sail which is fixed at the exterior of the jacket at the cushioning portion and at the connecting portion to the transition formed by the cushioning portion and the connecting portion. This measure helps connect the cushioning portion additionally to the connecting portion, and loads acting on the cushioning portion when the occupant immerses can be absorbed by the connecting portion and can be transmitted to the vehicle seat so that the position of the cushioning portion and the L-shape of the airbag are stabilized.

The fabric sail is preferably designed as a right-angled triangle and is fixed with its two legs to the exterior of the connecting portion and to the exterior of the cushioning portion, i.e., to the transition of each lateral part to the outer surface part of the airbag jacket so as to obtain proper load transmission.

It is possible to arrange a fabric sail on one side of the airbag only or on both sides of the airbag opposed in the seat vertical direction.

As a matter of course, a plurality of even different stabilizing elements can be provided on the airbag. All described stabilizing elements can mutually supplement each other and can increase, either each per se or taken together, the dimensional stability and inherent rigidity of the airbag.

In particularly preferred embodiments, the airbag of the vehicle occupant restraint system according to the invention includes at least one tether in the fillable area of the airbag, the tether being flatly spread and L-shaped corresponding to the L-shaped cross-section of the airbag.

At a free end of the cushioning portion of the airbag a fillable projection can be provided which extends, in the completely filled state of the airbag, in the direction of the seat back surface and which delimits specifically the baffle at the free end of the cushioning portion. Said fillable projection improves, for example, the protection in the case of angled impact in which the occupant does not immerse into the latter perpendicularly to the baffle but is rather oriented toward the free end of the cushioning portion.

For stabilizing said fillable projection, specifically at least one of the above-described flat tethers can also extend into the fillable projection and there can be connected to the jacket of the airbag. It would also be conceivable to provide another external stabilizing element in the form of a triangular fabric sail at the fillable projection and at the cushioning portion so as to stabilize the position of the fillable projection relative to the cushioning portion.

BRIEF DESCRIPTION OF THE DRAWINGS

In the following, the invention shall be described in detail by means of plural embodiments with reference to the attached Figures, wherein.

DESCRIPTION

Figure 1:
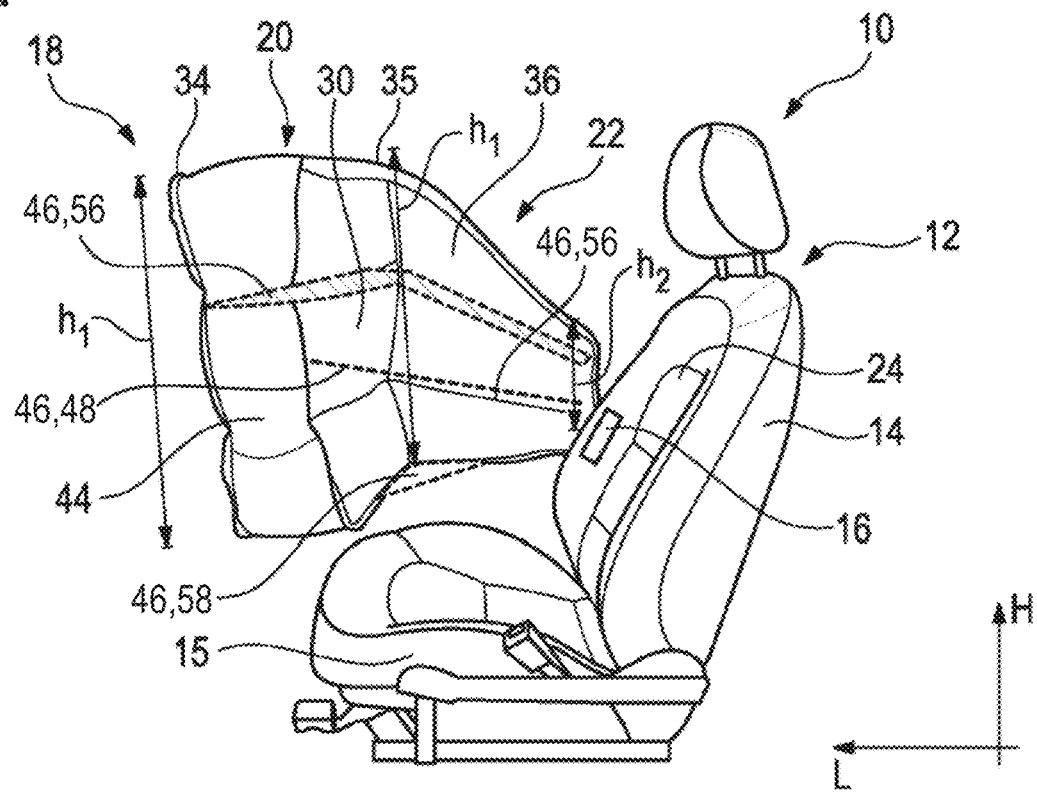
FIG. 1 shows a schematic perspective view of a vehicle occupant restraint system according to the invention comprising a vehicle seat and an airbag in the completely filled state.

The Figures illustrate a vehicle occupant restraint system 10 comprising a vehicle seat 12 that includes an airbag module 16 integrated in a backrest 14.

Apart from the backrest 14, the vehicle seat 12 also has a conventionally known seat portion 15, with the backrest 14 and the seat portion 15 being disposed one behind the other in a seat longitudinal direction L. In a conventional vehicle in a normal driving situation, the seat longitudinal direction L coincides with a vehicle longitudinal direction. However, it is also conceivable to provide driving situations in which the vehicle seat 12 is disposed in a deviating position so that the seat longitudinal direction L deviates from the vehicle longitudinal direction or is even oriented oppositely thereto.

Figure 2:
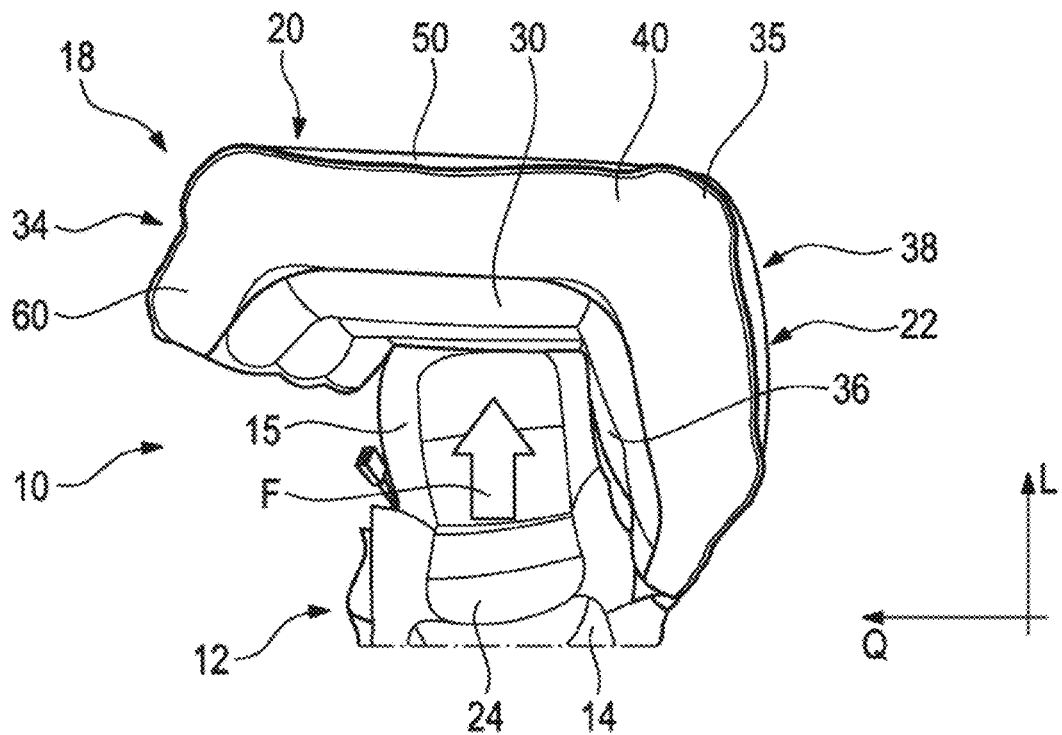
FIG. 2 shows the vehicle seat and the airbag of FIG. 1 in a top view.

FIGS. 1 and 2 generally illustrate the vehicle occupant restraint system 10, whereas the further Figures show details of specific embodiments.

Before a situation of restraint occurs, in the airbag module 16 an airbag 18 is received in the folded state. If a situation of restraint occurs, the airbag 18 is filled with filling gas via an inflator (not shown) and deploys out of the backrest 14 into the three-dimensional L-shaped configuration shown in FIGS. 1 and 2. Specifically, a section across the airbag 18 along a horizontal section plane is L-shaped.

The airbag 18 is composed of a fillable approximately plate-shaped cushioning portion 20 and an adjacent fillable connecting portion 22, the cushioning portion 20 being in fluid communication with the connecting portion 22. The cushioning portion 20 and the connecting portion 22 are oriented approximately at right angles with each other, as is evident from FIG. 2, for example, so that the cushioning portion 20 forms a first leg and the connecting portion 22 forms a second leg of the L.

As shown in FIG. 2, the connecting portion 22 in this example extends approximately along the seat longitudinal direction L and constitutes the transverse leg of the L, while the cushioning portion 20 extends approximately in a seat transverse direction Q extending perpendicularly to the seat longitudinal direction L and, accordingly, forms the longitudinal leg of the L. However, the lengths of the cushioning portion 20 and the connecting portion 22 in the transverse and seat longitudinal directions Q, L can be selected freely at the skilled person's discretion, wherein the length of the connecting portion 22 may also be larger than the length of the cushioning portion 20.

The connecting portion 22 is tightly connected to the airbag module 16 in the backrest 14, whereas the cushioning portion 20 is located freely in the vehicle interior in front of a seat back surface 24 of the backrest 14.

Figure 3:
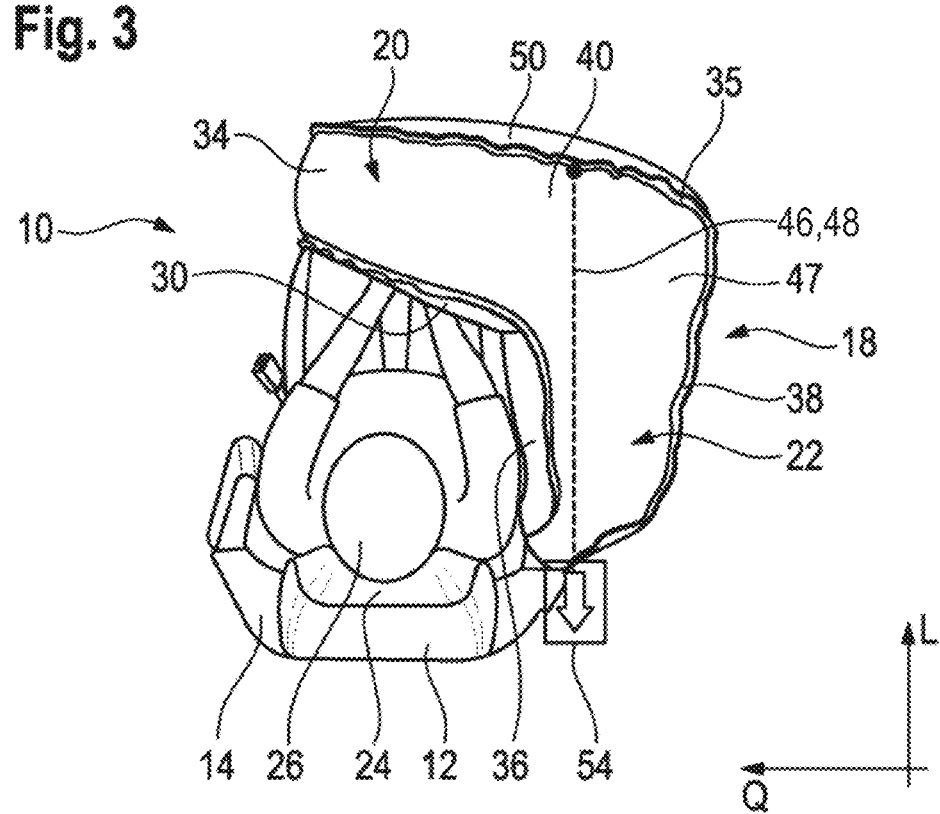
FIG. 3 shows the vehicle occupant restraint system according to the invention of FIG. 1 as set forth in a first embodiment in a top view.

Accordingly, the seat back surface 24 is the surface against which a vehicle occupant 26 will lean when he/she has taken a seat in the vehicle seat 12 (see, e.g., FIG. 3).

On the side facing the seat back surface 24, the cushioning portion 20 includes a baffle 30 provided to cushion the vehicle occupant 26, if he/she moves forward along the seat longitudinal direction L. The baffle 30 is opposed to and spaced from the seat back surface 24 so that the cushioning portion 20 of the completely filled airbag 18 is disposed approximately above the thighs of the vehicle occupant 26.

In the filled state of the airbag 18, the baffle 30 is located approximately in parallel to a seat vertical direction H.

Along the seat vertical direction H, a free end 34 of the cushioning portion 20 has a height h1. The cushioning portion 20 has approximately the same height h1 also at a transition 35 to the connecting portion 22. Along the extension of the connecting portion 22, the height thereof decreases to a height h2 which the airbag 18 adopts directly at the backrest 14 and which is approximately half the height h1, for example. This is clearly evident from FIG. 1. In another embodiment (not shown) the height h1 of the cushioning portion 20 and the height h2 of the connecting portion 22 have substantially the same height which is constant over the whole L-shape.

The jacket of the airbag 18 can be fabricated from a plurality of individual cut parts each of which can be flatly spread per se, with inner and outer surface parts 36, 38 being arranged in parallel to each other and being connected to the peripheral edges of two L-shaped lateral parts 40, 42. The free end 34 of the cushioning portion 20 can be formed by an edge part 44 formed, e.g., as a separate cut part or integrally with one or both of the lateral parts 40, 42 (see also FIG. 5).

The L-shaped lateral parts 40, 42 impart the L-shape which in the filled state is three-dimensional to the airbag 18.

In order to stabilize said L-shape, specifically the angle between the cushioning portion 20, more precisely the baffle 30, and the connecting portion 22 in a situation of restraint when the vehicle occupant 26 impacts the baffle 30, and to reduce a movement of the cushioning portion 20 along the seat longitudinal direction L, one or more stabilizing elements 46 are provided on the airbag 18.

On the airbag 18 in FIG. 1, three different stabilizing elements 46 are shown to illustrate the principle of the invention. However, it is also possible to provide the stabilizing elements 46 individually or in any combination on the airbag 18.

Figure 4:
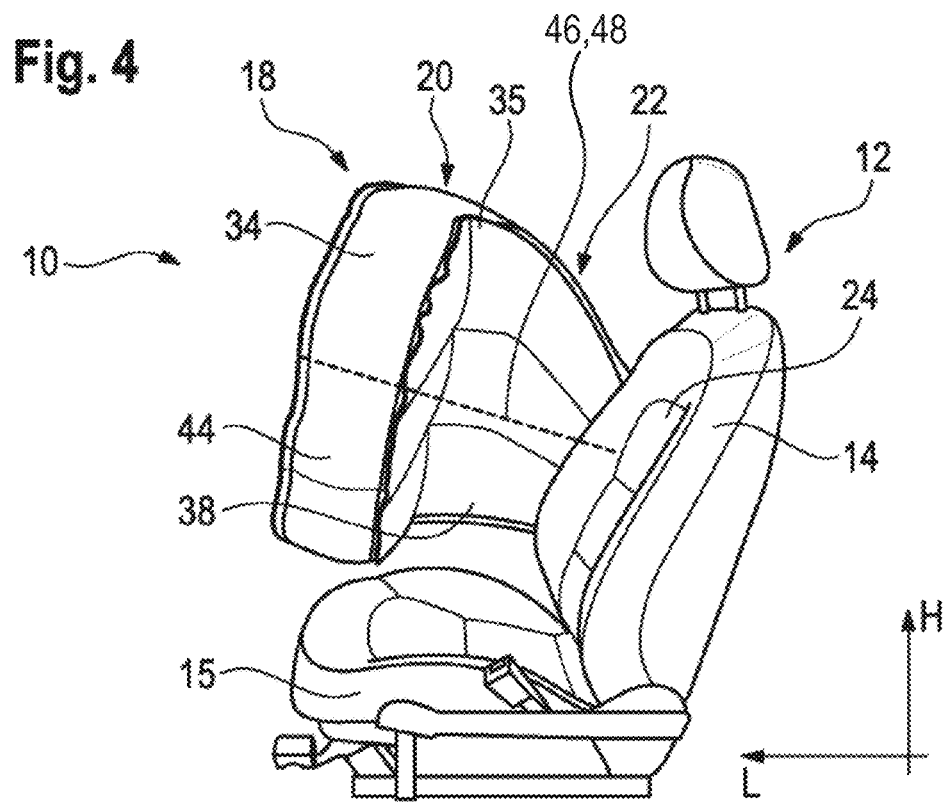
FIG. 4 shows the vehicle occupant restraint system of FIG. 3 in a schematic perspective view.

In a first variant, the stabilizing element 46 is formed in this case by a tether 48 extending inside a fillable area 47 of the airbag 18 (see also FIGS. 3 and 4) which is attached with the backrest 14 and an exterior 50 of the jacket facing the baffle 30 to the cushioning portion 20. The exterior 50 is part of the outer surface part 38 in this case.

The fillable area 47 is the volume of the airbag 18 which the inflator fills with filling gas, and in this case forms the whole connecting portion 22 and the whole cushioning portion 20.

As is shown in FIG. 3, the tether 48 extends straightly through the airbag 18. The tether 48 in this example is fastened at the exterior 50 to a fastening point so that it divides the distance between the transition 35 of the connecting portion 22 to the cushioning portion 20 on the outer surface part 38 and the free end 34 of the cushioning portion 20 approximately at a 1/3 to 2/3 ratio, the shorter distance being located close to the transition 35.

In this example, at the backrest 14 the tether 48 is connected to a retracting mechanism 54 that is designed to reduce a free length of the tether 48 during the situation of restraint. The retracting mechanism 54 is a belt retractor or a belt tensioner (not shown in detail), for example. The retracting mechanism 54 is activated while or after the airbag 18 is filled or the vehicle occupant 26 impacts the baffle 30 so as to generate tensile force toward the seat back surface 24 which counteracts the load F applied to the cushioning portion 20 by the vehicle occupant 26 (see FIG. 2). In this way, the cushioning portion 20 is stabilized against said load F in its unloaded position.

Accordingly, the tether 48 extends through the whole connecting portion 22 and through the whole fillable volume of the cushioning portion 20 along the seat longitudinal direction L, viz. longitudinally through the connecting portion 22 and transversely through the cushioning portion 20. This can be seen from FIGS. 3 and 4.

It is also possible to provide a plurality of tethers 48.

Figure 5:
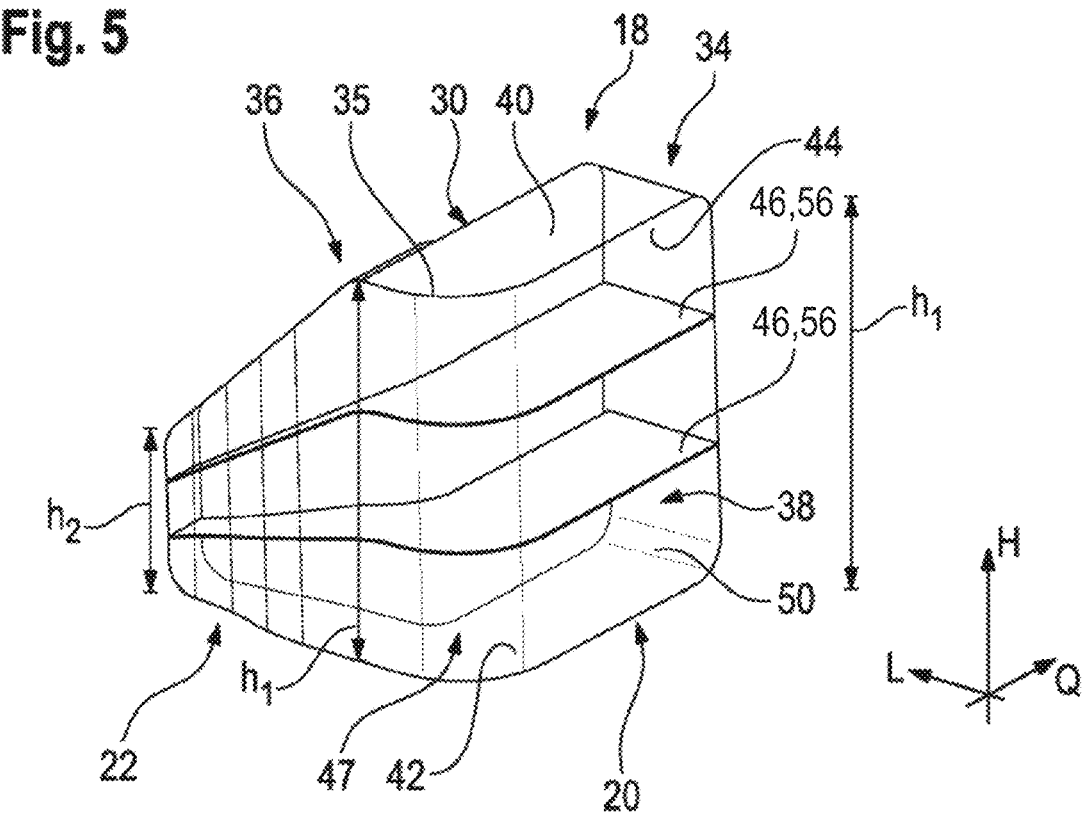
FIG. 5 shows the airbag of the vehicle occupant restraint system according to the invention of FIG. 1 as set forth in a second embodiment in a schematic perspective view.

FIG. 5 illustrates the stabilizing element 46 in a second variant in the form of one or more flat L-shaped tethers 56. One of said tethers 56 is also indicated in FIG. 1.

FIG. 5 shows a variant having exactly two flat tethers 56 superimposed in parallel to each other along the seat vertical direction H. It would also be possible, however, to make use of only one flat tether 56 or of more than two flat tethers 56. In this case, the two tethers 56 are interposed between the two lateral parts 40, 42.

The flat tether 56 is, e.g., a fabric part which, as to its shape, corresponds to the upper or lower lateral part 40, 42 of the jacket and, thus, also to the L-shaped cross-section of the airbag 18, and which is disposed approximately in parallel to the lateral parts 40, 42 in the fillable area 47 inside the airbag 18 and, along its periphery, is fastened to the jacket. Specifically, fasteners are provided at the inner surface part 36, at the outer surface part 38 as well as at the edge part 44. It is possible to connect the flat tether 56 along its entire periphery, or only at particular portions, to the jacket of the airbag 18.

The gas generated by the inflator and flowing into the airbag 18 distributes evenly in the chambers defined by the flat tethers 56 in the fillable area 47 of the airbag 18.

If the vehicle occupant 26 impacts the baffle 30, the flat tether or tethers 56 ensure additional stabilization of the cushioning portion 20 in its unloaded position.

Figure 6:
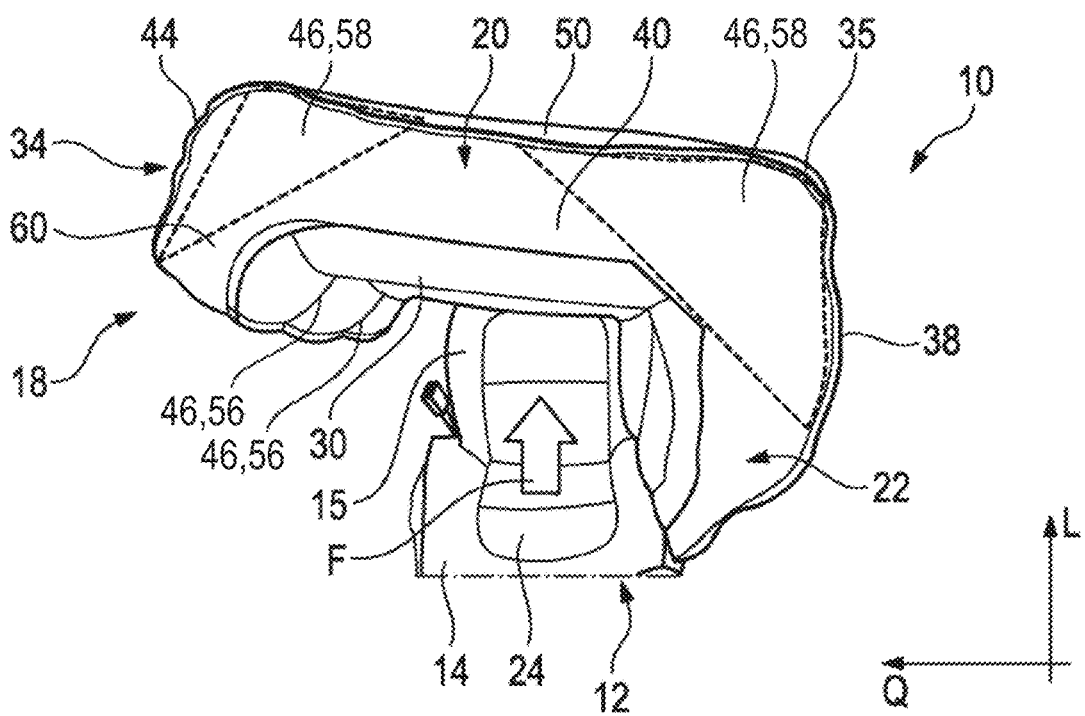
FIG. 6 shows the vehicle occupant restraint system according to the invention of FIG. 1 as set forth in a third embodiment in a top view.

In a third variant shown in FIGS. 1 and 6, the stabilizing element 46 is formed by a flat fabric sail 58 arranged on the outside of the airbag 18 outside the fillable area 47 at the transition 35 between the connecting portion 22 and the cushioning portion 20 in parallel to the upper lateral part 40 or in parallel to the lower lateral part 42 of the jacket of the airbag 18.

The fabric sail 58 in this case takes the shape of a right-angled triangle, the two legs of the triangle being fixed to the outer surface part 38, specifically to a connecting seam between the outer surface part 38 and the respective lateral part 40, 42. The hypotenuse of the triangle thus extends from the connecting portion 22 to the cushioning portion 20. As a result, the fabric sail 58 ensures the cushioning portion 20 to be stabilized in its unloaded position, even if the vehicle occupant 26 impacts the baffle 30.

It is possible to provide only one fabric sail 58 at an upper or a lower end of the airbag 18 along the seat vertical direction H or a fabric sail 58 on each of the two sides of the airbag 18 opposed along the seat vertical direction H.

All stabilizing elements 46 are provided in this case to remain tightly connected to the airbag 18 throughout the entire situation of restraint and to exert their stabilizing effect throughout the whole situation of restraint.

In FIGS. 2 and 6, a variant of the airbag 18 is shown in which the free end 34 of the cushioning portion 20 is configured with a fillable projection 60 pointing toward the seat back surface 24 and, thus, delimiting the baffle 30 at the free end 34. The fillable projection 60 offers an improved restraining effect in the event of oblique impact.

In the example shown here, the fillable projection 60 merges into the volume of the cushioning portion 20 and is formed substantially by the fact that an appropriately shaped excess fabric is provided at the lateral parts 40, 42 of the jacket of the airbag 18, the shape of said excess fabric corresponding to the fillable projection 60. Said fillable projection 60 can be used on the airbag 18 both with the above-described stabilizing elements 46 and independently thereof.

FIG. 6 exemplifies, in addition to the fabric sail 58 at the transition 35 from the cushioning portion 20 to the connecting portion 22, a fabric sail 58 at the upper end of the airbag 18 on the upper lateral part 40 even at the free end 34.

All above-described stabilizing elements 46 may be used jointly, alone or in any combination, as shown in FIG. 1, for example.

In particularly preferred embodiments of the vehicle occupant restraint system 10, the airbag 18 comprises at least one L-shaped tether 56, as it has turned out that specifically by introducing at least one such L-shaped tether 56 the stability of the airbag 18 can be considerably increased.

The inherent rigidity of the L-shaped airbag 18 is significantly increased by the use of one or more stabilizing elements 46 so that the cushioning portion 20 of the airbag 18 maintains its position substantially even while it cushions the vehicle occupant 26.

The invention claimed is:

1. A vehicle occupant restraint system comprising a vehicle seat which includes a backrest with a seat back surface, the seat back surface being provided for a vehicle occupant seated in the vehicle seat to lean against the same, and comprising an airbag module integrated in the vehicle seat and including an airbag which is L-shaped in a horizontal section plane and which has a fillable cushioning portion forming a first leg of the L-shape, the fillable cushioning portion being positioned along a seat longitudinal direction spaced from the seat back surface and including a baffle directed toward the seat back surface, the baffle being provided to cushion the vehicle occupant if he/she moves forward along the seat longitudinal direction, wherein the airbag comprises a fillable connecting portion forming a second leg of the L-shape which connects the fillable cushioning portion to a first lateral side of the backrest of the vehicle seat, and wherein the airbag includes at least one stabilizing element which counteracts a load being directed away from the seat back surface and acting on the cushioning portion, if the vehicle occupant impacts the baffle, so as to stabilize the fillable cushioning portion relative to the fillable connecting portion, the stabilizing element having a first end portion connected to the fillable connecting portion laterally of the backrest and, the connection of the first end portion extending along the fillable connecting portion in the longitudinal direction from the seat back surface toward the baffle, the stabilizing element having an opposite second end portion connected to the fillable cushioning portion at a location that is spaced from the seat back surface in the longitudinal direction so that the backrest bears the load directed away from the seat back surface, wherein the vehicle occupant restraint system is free from structures connected to a second lateral side of the backrest, opposite the first side of the backrest, that are configured to support the fillable cushioning portion from the second lateral side of the backrest.

2. The vehicle occupant restraint system according to claim 1, wherein the stabilizing element is disposed inside a fillable area of the airbag.

3. The vehicle occupant restraint system according to claim 2, wherein the stabilizing element is formed by one or more tethers extending through the fillable area of the airbag.

4. The vehicle occupant restraint system according to claim 2, wherein at least one tether is provided which, on a seat side, is coupled to a retracting mechanism that shortens the length of the at least one tether in the fillable area of the airbag during the situation of restraint.

5. The vehicle occupant restraint system according to claim 2, wherein at least one tether is provided which, when being flatly spread, is L-shaped corresponding to the L-shaped cross-section of the airbag.

6. The vehicle occupant restraint system according to claim 5, wherein at least two tethers are provided which are superimposed perpendicularly to the seat longitudinal direction and which divide the airbag into plural superimposed fillable chambers.

7. The vehicle occupant restraint system according to claim 1, wherein the stabilizing element is disposed at the exterior of the airbag.

8. The vehicle occupant restraint system according to claim 7, wherein the stabilizing element is at least one fabric sail which is fixed to the fillable cushioning portion and to the fillable connecting portion in a transition formed by the fillable cushioning portion and the fillable connecting portion.

9. The vehicle occupant restraint system according to claim 1, wherein plural different stabilizing elements are provided on the airbag.

10. The vehicle occupant restraint system according to claim 1, wherein a fillable projection extending in the direction of the seat back surface is provided at a free end of the fillable cushioning portion.

11. The vehicle occupant restraint system according to claim 1, wherein the stabilizing element comprises a free edge that extends from the first end portion to the second end portion.

12. The vehicle occupant restraint system according to claim 11, wherein the stabilizing element comprises a triangular sheet having a first edge connected to the airbag along the fillable connecting portion and a second edge connected to the airbag along the fillable cushioning portion, wherein the free edge is without connection to the airbag.

13. The vehicle occupant restraint system according to claim 12, wherein the triangular sheet is connected to an outer surface part of the airbag.

14. The vehicle occupant restraint system according to claim 13, wherein the free edge extends diagonally from the fillable connecting portion to the fillable cushioning portion.

15. The vehicle occupant restraint system according to claim 13, wherein the triangular sheet is connected to an upper end of the airbag, to a lower end of the airbag, or wherein two triangular sheets are provided, with one of the two triangular sheets being connected to the upper end of the airbag and the other of the two triangular sheets being connected to the lower end of the airbag.

16. The vehicle occupant restraint system according to claim 1, wherein the first end portion of the stabilizing element extends along the fillable connecting portion from laterally adjacent the backrest to the baffle.

\* \* \* \* \*